United States Patent
Kaufman et al.

(10) Patent No.: US 6,476,392 B1
(45) Date of Patent: Nov. 5, 2002

(54) METHOD AND APPARATUS FOR TEMPERATURE COMPENSATION OF AN UNCOOLED FOCAL PLANE ARRAY

(75) Inventors: Charles S. Kaufman, Long Beach, CA (US); Randolph S. Carson, Carson City, NV (US); William B. Hornback, Trabuco Canyon, CA (US)

(73) Assignee: Irvine Sensors Corporation, Costa Mesa, CA (US)

( * ) Notice: Subject to any disclaimer, the term of this patent is extended or adjusted under 35 U.S.C. 154(b) by 0 days.

(21) Appl. No.: 09/853,819

(22) Filed: May 11, 2001

(51) Int. Cl.[7] .................................................. G01J 5/10
(52) U.S. Cl. ............... 250/332; 250/370.08; 250/338.4; 250/252.1
(58) Field of Search ............................ 250/332, 370.08, 250/338.4, 252.1

(56) References Cited

U.S. PATENT DOCUMENTS 5,631,466 A * 5/1997 Botti et al. ............... 250/252.1
5,965,892 A * 10/1999 Tanaka ..................... 250/338.4
6,028,309 A * 2/2000 Parrish et al. .............. 250/332

* cited by examiner

*Primary Examiner*—Constantine Hannaher
*Assistant Examiner*—Andrew Israel
(74) *Attorney, Agent, or Firm*—Myers Dawes & Andras; Daniel L. Dawes; Joseph C. Andras

(57) ABSTRACT

A temperature dependent focal plane array operates without a temperature stabilization cooler and/or heater over a wide range of ambient temperatures. Gain, offset and/or bias correction tables are provided in a flash memory in memory pages indexed by the measured temperature of the focal plane array. The memory stores a calibration database, which is accessed using a logic circuit which generates a memory page address from a digitized temperature measurement of the focal plane array. The calibration database is comprised of an array of bias, gain and offset values for each pixel in the focal plane array for each potential operating temperature over the entire range of potential operating temperatures. The bias, gain and offset data within the database are read out, converted to analog form, and used by analog circuits to correct the focal plane array response.

23 Claims, 3 Drawing Sheets

METHOD AND APPARATUS FOR TEMPERATURE COMPENSATION OF AN UNCOOLED FOCAL PLANE ARRAY

BACKGROUND OF THE INVENTION

1. Field of the Invention

The invention relates to infrared instruments and cameras and in particular to calibration of the same.

2. Description of the Prior Art

Recent advances in infrared (IR) detector technology have led to the commercially availability of new detector technologies that do not require cryogenic cooling. These new detector technologies include ferroelectric and microbolometer technologies. The currently commercially available microbolometer detector arrays are based on a technology that was originally developed by Honeywell Sensor & System Development Center and was licensed to Boeing (formerly Rockwell), Raytheon (formerly Hughes' Santa Barbara Research Center) and British Aerospace (formerly Loral).

While these new technologies do not require cryogenic cooling, they are traditionally operated with a thermoelectric cooler to maintain a constant focal plane temperature usually between 0° to 20° C. The purpose of maintaining a constant detector temperature is that this will simplify the interpretation of the signal generated by the detector array and the generation of a thermal image. Since the detector is at a constant temperature, any measured voltage changes must correspond to thermal differences in the scene that is being imaged onto the focal plane array (focal plane array). The resulting simplification in processing is a result of assuming that the measured temperature differences and the temperature of focal plane array are constant. The apparent temperature from an object in the scene as compared to the average temperature of the scene at the focal plane array are small as compared to the average temperature of the scene ($\Delta T \ll T$). Assuming the temperature of the focal plane array is constant, then it can be assumed that the measured changes in voltage, that are the result of resistivity changes, are considered to be approximately linear as related to temperature. Since the transform is based on a linear relationship, then the slight differences in the responsivity of the individual elements in the array are typically corrected using a two point calibration that determines an offset and gain correction for each pixel. The results of this two point calibration are independent of the ambient temperature.

While there is a potential of using an uncooled microbolometer focal plane array without a thermoelectric cooler, the difficulty is that calculating the conversion between the measured voltage to a perceived scene temperature difference is now a more complex calculation. The relationship between the voltage and the temperature varies with the temperature of the focal plane array, and the specifics of this variation are different for every pixel in the array. Since the focal plane array temperature is unregulated, just viewing an IR scene will result in heating of the focal plane array.

BRIEF SUMMARY OF THE INVENTION

The invention is directed to a method to vary the gain, offset and/or bias correction tables as a function of ambient temperature without the use of intensive digital numeric processing and to an apparatus for performing the same. The invention corrects for the temperature induced non-uniform response of a array of detectors in a focal plane array (focal plane array) without the use of digital processing and/or computations. The invention permits the operation of a temperature dependent focal plane array without a temperature stabilization cooler and/or heater over a wide range of ambient temperatures. The method of the invention comprises an electronic implementation using high density flash random access memory, RAM, as the memory storage medium for the calibration database, accessing this database based digitized temperature measurements, and then using the bias, gain and offset data within the database to correct for focal plane array response variation induced by temperature changes. The calibration database is comprised of an array of bias, gain and offset values for each pixel in the sensor for each potential operating temperature over the entire range of potential operating temperatures.

One of the innovations incorporated into the invention is based on using limited analog processing and the digitized response of reference temperature measurements from the focal plane array, as an index marker that can be used to directly access the appropriate bank of flash memory that contains the appropriate gain, offset, and bias settings that can either be read directly into the focal plane array via its read-out integrated circuit or can be performed using simple analog or digital circuits.

One benefit of the invention is that imagery generated from an focal plane array, whose response varies non-uniformly with temperature will be consistent even as the ambient temperature varies. The illustrated embodiment explicitly contemplates a long wave infrared (LWIR) microbolometer focal plane array typically operating in the range of 8–14 $\mu$m and a short wave infrared (SWIR) InGaAs focal plane array typically operating in the range of 0.7–1.5 $\mu$m such as Sensors Unlimited, Inc.'s model number SU320-1.7T1. However, any focal plane array now known or later devised may benefit from application of the present invention. This approach for compensating for ambient temperature variation will significantly reduce the power as compared to the traditional approach based on using a thermoelectric cooler to regulate the temperature of the focal plane array or using a processor to calculate the values in real time.

The methodology of the invention is based on using flash memory to retain all potential bias, gain and offset values. This memory is accessed via digitization of a temperature measurement with no digital processing required. As a result the size, power consumption and production cost of the camera is significantly reduced.

This invention provides a compact, low-power-consumption, commercially viable approach to compensate for temperature induced non-uniform response of the focal plane array. This methodology has the ability to reduce the size, weight and production cost of LWIR cameras based on microbolometer focal plane array technology and SWIR cameras based on InGaAs focal plane array technology, while improving reliability. The use of this temperature compensation approach will result in the elimination of cooling and digital processing electronics without sacrificing overall system performance.

The gain, offset and/or bias for each pixel of the focal plane array is determined at each small temperature increment over the entire operating temperature range. The size of this small temperature increment is based on temperature measurement accuracy and the minimum temperature increment that results in a significant change in the focal plane array's response. This data is stored in high density flash memory such that:

The pixel order in which the data is stored is the same as the pixel order addressed by the read-out integrated circuit on the focal plane array;

Data for each temperature increment is stored in a separate and discrete addressable page of the flash memory; and The address of these pages of data in flash memory are stored in temperature increment order.

The resulting flash memory database can then be accessed by:

Measuring the ambient temperature on the focal plane array;

Digitizing this temperature measurement using an analog to digital converter (ADC);

Applying a fixed offset and gain value to this digitized temperature reading that results in calculating the flash memory address; and The address is then used as a pointer to the portion of memory that should be read out, where the portion of memory that is read out is the data for the measured ambient temperature of the focal plane array.

While the method may be described below for the sake of grammatical fluidity as steps, it is to be expressly understood that the claims are not to be construed as limited in any way by the construction of "means" or "steps" limitations under 35 USC 112, but to be accorded the full scope of the meaning and equivalents of the definition provided by the claims. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The invention is directed to a low power infrared (IR) camera that operates without a temperature stabilization system or real time calculation of detector coefficients. What will be described is an illustrated embodiment in which the invention is employed, namely a camera system 10. The invention is expressly not limited to the illustrated embodiment and may be equally applied to many other systems which are quite different in nature. Therefore, before considering the invention briefly summarized above, consider one environment or illustrated embodiment in which it may be used to advantage.

In the illustrated embodiment the invention is incorporated into an ultra compact camera system 10 manufactured by Irvine Sensors, Costa Mesa, Calif. This embodiment utilizes a microbolometer imaging array 20, namely model Gen-4, 320×240 UFPA, manufactured by Boeing Aircraft, Seattle, Wash. Again any focal plane array could be substituted. The infrared (IR) based camera system 10 modified according to the invention expands the utility of the prior camera system by allowing the camera system 10 to collect thermal imaging based still and video digital images. This expands the system's operational potential to nighttime and other low light level operations. The use of thermal imaging has additional mission enhancement capabilities based on the collection of temperature difference data e.g., determining the fuel level in tanker trucks that drive past, determining which rooms of a building are occupied by observing the temperature of windows/walls, etc.

Figure 1:
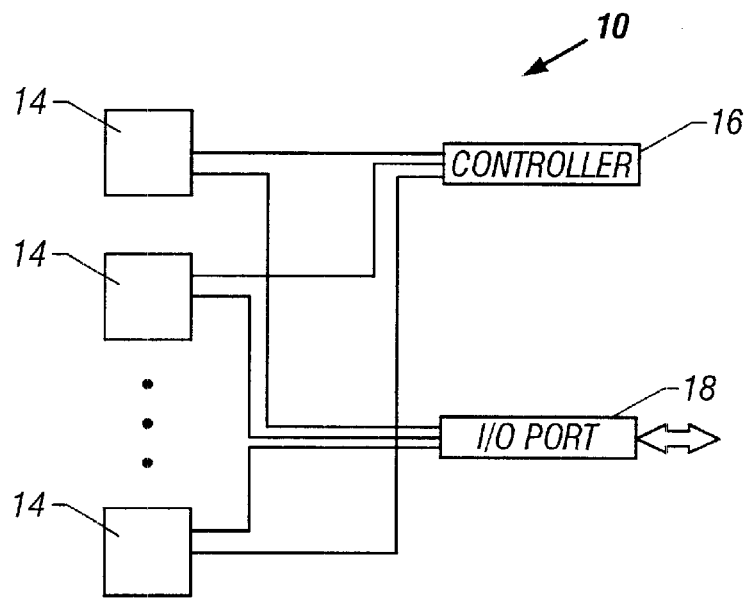
FIG. 1 is a simplified block diagram of a camera system in which the invention has been employed.

The camera system 10 as diagrammatically depicted in FIG. 1 is comprised of a plurality of cameras 14 and a system controller 16. In one embodiment each miniaturized electronic camera 14 records still, monochrome images. However, the invention is equally applicable to video cameras and to systems. The illustrated embodiment will, however, address only still, monochrome images. Camera 14 uses an electronic shutter that is triggered through an external trigger signal, and/or at pre-programmed times. Clearly, in the case of a video camera, shuttering of the camera is supplied automatically by the camera's controller and an external trigger is not required other than to control the on/off operation of the video camera. The camera system 10 is programmed, interrogated, and its images downloaded through an infrared input/output (I/O) port 18. Its primary Intended use is in unattended, covert installations for surveillance and observation.

The advantage of eliminating the requirement of cryogenic cooling includes improved reliability, reduced size, reduced weight and reduced power consumption. The primary disadvantage is that these uncooled detector technologies are less sensitive (lower responsivity and D*) than cryogenically cooled arrays. Responsivity is defined as the ratio of the rms signal voltage or current output to the rms radiant signal power input, and D* which is defined as the normalized reciprocal of the value of monochromatic incident rms signal power of wavelength A required to produce an rms signal-to-rms-noise ratio of unity. This reduction in detector sensitivity is compensated by using faster optics (lower f numbers), longer integration times, and larger detector elements (50 microns) in order to increase the amount of energy collected. The trade-off for this compensation is larger and more complex optics and reduced resolution. Reduced resolution is a result of fewer detector elements and shorter optical focal lengths.

Figure 2:
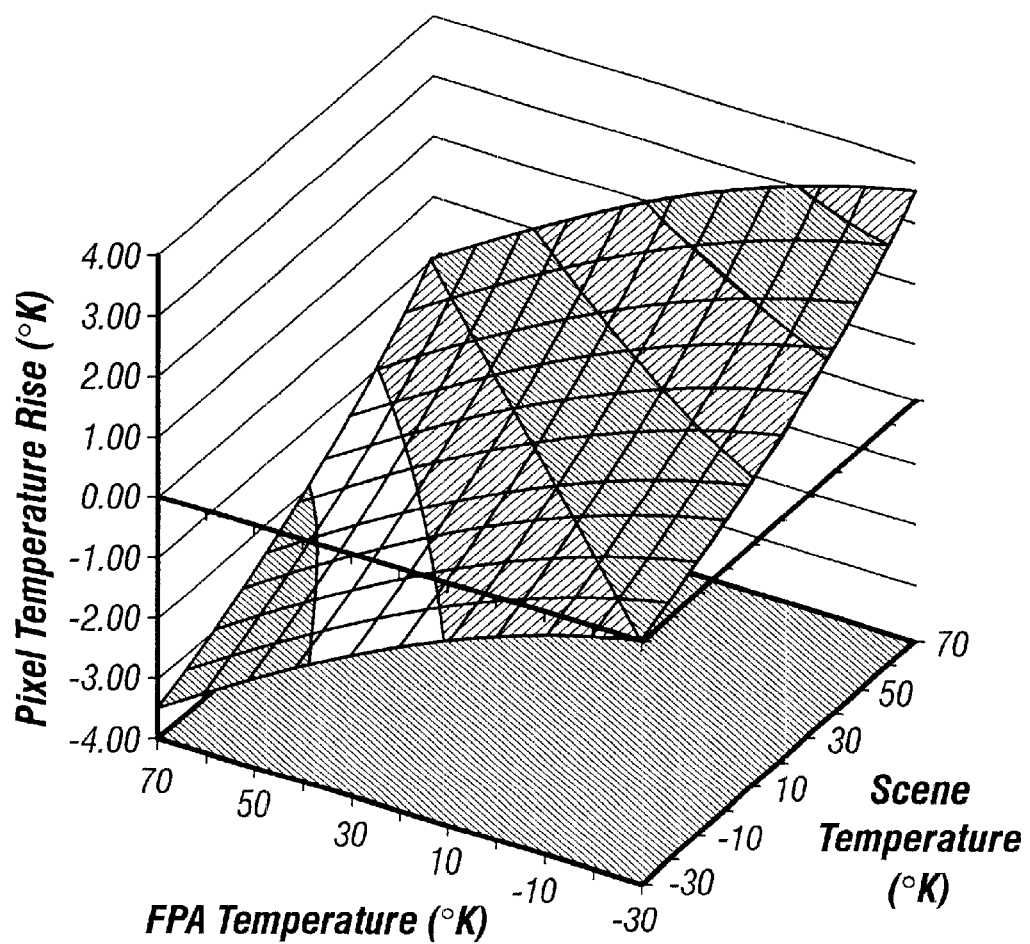
FIG. 2 is a three dimensional graph of the temperature dependence of a focal plane array.

To obtain the advantages of an uncooled camera, then the temperature dependence of the camera must be compensated. FIG. 2 is a three dimensional graph which shows the pixel temperature rise on the z axis as a function of temperature for both the focal plane array on the x axis and scene on the y axis. It was assumed that the pixel was black and was exchanging heat with a blackbody with the solid angle (f/1), area and thermal conductance based on the Boeing microbolometer design. FIG. 2 shows some nonlinearity because of the 4th-power dependence on absolute temperature. As a result FIG. 2 is essentially an empirical plot of model T 884-T FPA4 manufactured by Boeing.

Again the invention will illustrated in terms on a bolometer array and resistances of each pixel detector, but can be equally applied to a photodetector array and voltage or current output of pixel detector. The calibration required to transform a measured resistance from a single detector element in the bolometer array 20 varies as a function of the ambient temperature and hence the temperature of the focal plane array treated as in equilibrium with the ambient, and the intensity of the radiant signal measured. The following equation summarizes this dependence.

$$Z_j(T, I) = g_j(T)[Z_j(T, I) + Z_{j,o}(T)]$$

Where $Z_j$ is the impedance of the jth detector, T is temperature of the focal plane array, I is the intensity of the incident radiant energy, $g_j$ is the gain of the jth detector at temperature T and $g_{j,o}$ is an offset value associated with the jth detector at temperature T.

This function will be different for each detector element in the focal plane array 20. Since the bolometer or detecting element of array 20 is a resistor, the way the resistance is measured (in both the Boeing and Raytheon implementations) utilizes a bridge 22 of resistors as more fully described in the copending application entitled, Ser. No. 09/853,245, filed May. 11, 2001 and incorporated herein by reference. An effect of this method of measurement is that the act of measuring resistance will also heat the bolometer detectors and change its electrical characteristics. The longer it takes to perform this resistance measurement, the greater the internal heating. Unfortunately, the amount of time used to conduct a resistance measurement is based on the integration time, and the integration time will vary based on the contents of the scene being measured.

Figure 3:
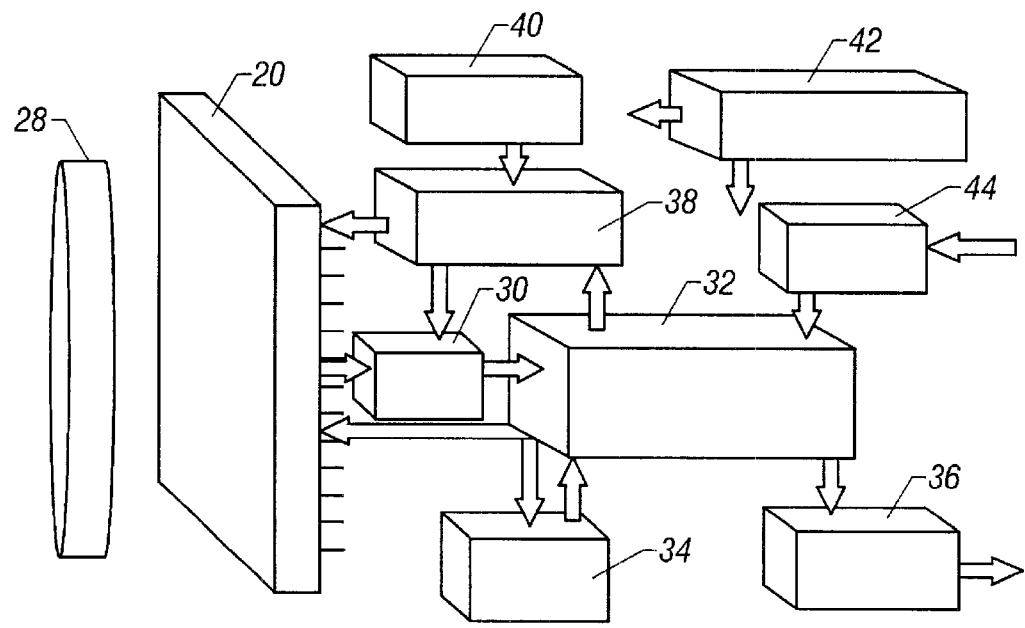
FIG. 3 is a block diagram of a prior art approach to providing temperature compensation to a focal plane array.

The method of the invention compensates for these effects by using a variable offset (or level) and gain. With this method, there can be different compensation value for each pixel detector, each ambient temperature, and each integration time although in the illustrated embodiment the integration time is fixed at about 16ms to maximize sensitivity. Consider first the prior art method and most direct way to implement the needed compensation variability is based on a strictly digital implementation shown in FIG. 3. Camera 14 is symbolically denoted in FIG. 3 as comprised of optics 28 and array 20. Array 20 is coupled through an analog-to-digital converter 30 to a processor 32. Processor 32 is coupled in turn to a database memory 34 and to a video output 36. Addressing, biasing and clocking of array 20 is provided through master clock 40 and addressing, biasing and clocking circuit 38. General power regulation and signal conditioning is provided by circuit 42 and control signal interfacing into processor 32 is provided by control signal interface circuit 44. The design of FIG. 3 is currently implemented in the laboratory by Boeing, Raytheon and British Aerospace. It relies on the use of a digital processor 32 to access and extrapolate a specific calibration data set that is derived from a limited digital database 34. This approach is based on limited or small database 34 and requires an elaborate calibration procedure to generate the compensation signal. This calibration procedure only needs to be performed once, but it must be performed on every camera 14. As is also the case in the present invention, the above calibration procedure requires the use of an automated fixture (not shown) that operates the camera at a variety of temperatures, since the collection of a complete set calibration data requires hundreds of hours per camera.

The primary limitation of the prior art approach shown in FIG. 3 is that the digital signal processing resources required to support real time operation at video rates are significant. The current laboratory demonstrator units perform these functions using a desktop or a laptop PC. This results in a loss of many of the advantages of eliminating the thermoelectric cooler, i.e., the potential power saved by eliminating a thermoelectric cooler is not realized since additional power is required to operate the digital signal processing.

Another prior art approach that is being examined is to use a 3-point calibration that would incorporate a global bias equalization that could be used to offset the sum of the effects of ambient temperature variation. This results in simplifying some of the processing requirement but a digital signal processor(s) 32 is still required.

One of the innovations incorporated into the invention is based on using some limited analog processing and the digitized response of reference temperature measurements from the focal plane array. The temperature measurements from the focal plane array 20 are used as an index marker that can be used to directly access the appropriate bank of flash memory 46. The bank of flash memory 46 which is accessed contains the appropriate gain, level, and bias settings that can be read directly into the focal plane array 20 via its readout integrated circuit 24. The number of variables associated with the detector depends on the nature of the detector. In the illustrated embodiment, only gain and offset are used, but in actual practice one, two or three detector parameters would be common, and there is nothing to exclude the possibility of even more detector parameters from being included.

Figure 4:
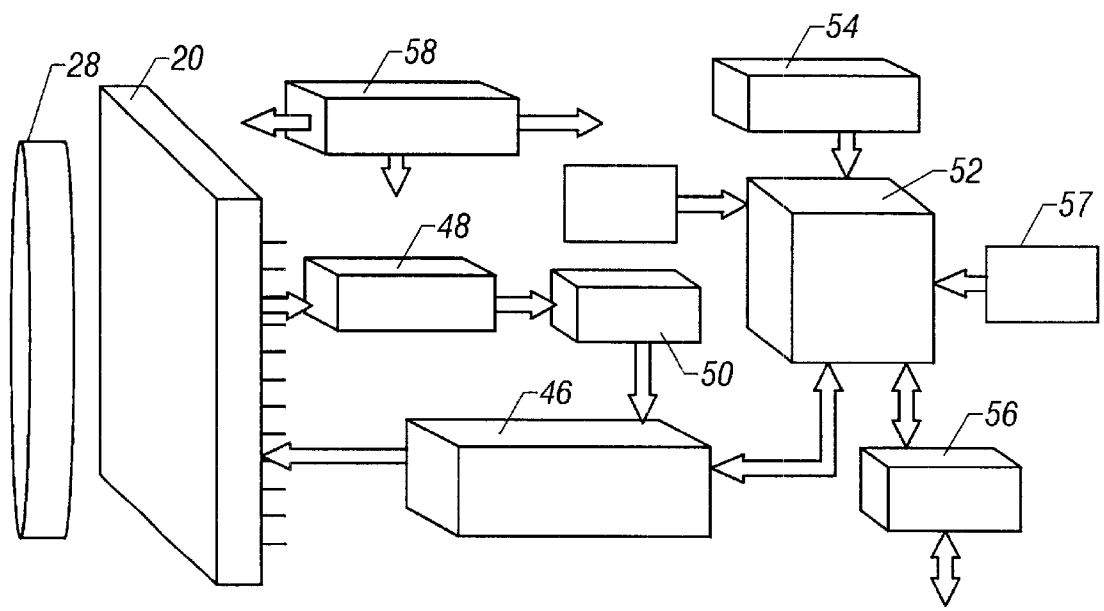
FIG. 4 is a block diagram of one embodiment of the invention in which temperature compensation is provided to a focal plane array.

The invention instead employs a unique concept that improves on the basic prior art concept illustrated in FIG. 3. This concept is illustrated in FIG. 4. Array 20 is coupled to analog logic circuit 48, which conditions a signal which measures the temperature of the focal plane array in array 20 using a thermistor (not shown) or any other temperature measuring device. Circuit 48 has its output coupled to analog-to-digital converter 50, which generates a memory address corresponding to the measured temperature. The output of analog-to-digital converter 50 is coupled directly to flash memory 46 to address a bank of memory corresponding to the measured temperature of the focal plane array 20. The addressing of memory 46 within the addressed bank is then controlled by digital logic circuit 52, which in turn is coupled to master clock 54 and to a bidirectional wireless digital data link or interface 56. External command signals, such a triggers and the like, can be interfaced to digital logic circuit 52 through interface 57. Power requirements are provided by battery power supply 58. The invention eliminates the requirement for a digital signal processor 32 and uses a high density flash RAM 46 as the memory storage medium for the calibration database and logic circuits for controlling data flow.

Figure 5:
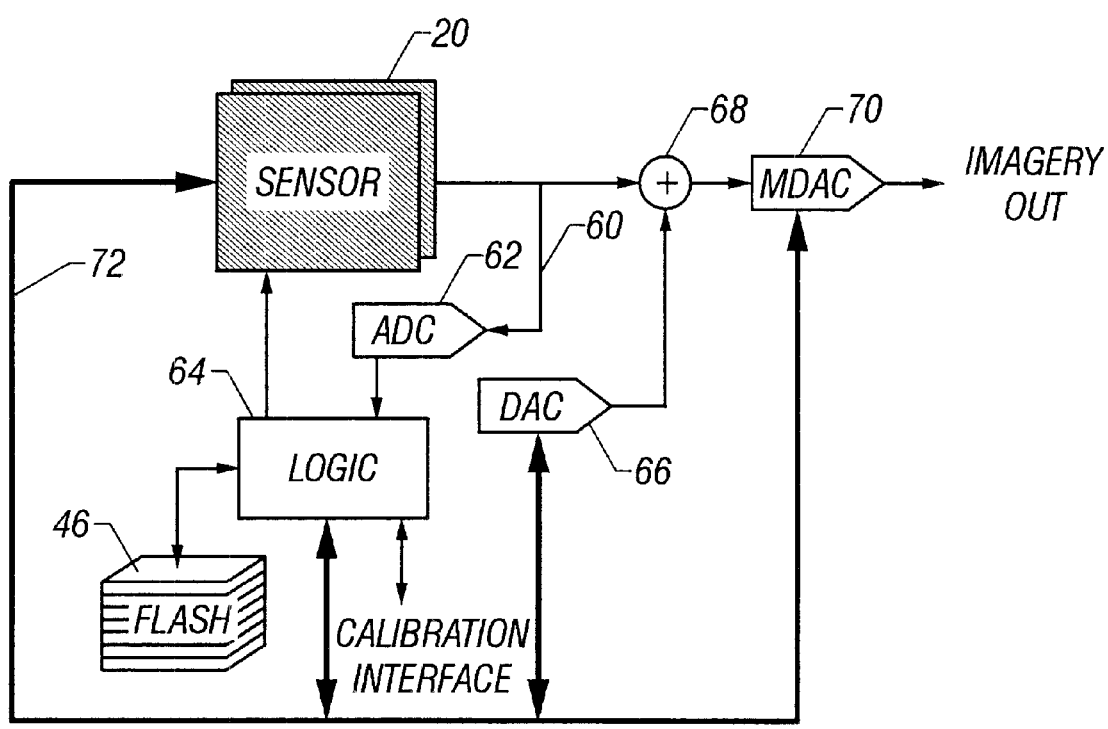
FIG. 5 is a block diagram of the processing of data signals in the embodiment of FIG. 4.

Consider the data flow and control as alternatively depicted in the diagram of FIG. 5 of the illustrated embodiment. The temperature of focal plane array 20 is coupled via line 60 to an analog-to-digital converter 62, which outputs the digitized temperature to a logic circuit 64, such as a field programmable gate array. There are many equivalent ways in which the logic circuitry used in the invention may be implemented and the illustrated embodiment shows one possible generic approach. Logic circuit 64 converts the temperature into an appropriate memory address which is provided to flash memory 46. Logic circuit 64 then addresses the appropriate data bank and reads out the gain and offset for each pixel location and provides the offset data, $Z_{j,o}(T)$, to digital-to-analog converter 66. The offset data, $Z_{j,o}(T)$, is then added to the raw measured output of the pixel detector in analog adder 68. The sum is then multiplied by the gain, $g_j(T)$, in digital-to-analog multiplier and converter 70. The output of multiplier and converter 70 is the temperature compensated value for the jth pixel location at temperature T. This is then provided as data stream for still or video picture composition according to conventional means. A global bias based on the ambient temperature, T, is coupled via line 72 from logic 64 to sensor array 20.

As depicted in the feedback control processing flow shown in FIG. 5 the method of the invention varies the gain, offset and/or bias correction tables as a function of ambient temperature without the use of intensive digital numeric processing and to an apparatus for performing the same. The invention corrects for the temperature induced non-uniform response of focal plane array 20 of detectors without the use of digital processing and/or computations. The invention permits the operation of a temperature dependent focal plane array without a temperature stabilization cooler and/or heater over a wide range of ambient temperatures. The method of the invention comprises an electronic implementation using high density flash random access memory 46 as the memory storage medium for the calibration database, accessing this database based digitized temperature measurements of array 20, and then using the bias, gain and offset data within the database to correct for focal plane array response variation induced by temperature changes. In the illustrated embodiment, bias is fixed for all detector elements or pixels at $R_0/C_{int}$ and then gain and offset are applied to the signal at each detector or pixel output. In general, bias may be applied on a pixel-by-pixel basis as well. The calibration database is comprised of an array of bias, gain and offset values for each pixel in the sensor array 20 for each potential operating temperature over the entire range of potential operating temperatures.

One of the innovations incorporated into the invention is based on using limited analog processing and the digitized response of reference temperature measurements from the focal plane array 20, as an index marker that can be used to directly access the appropriate bank of flash memory 46 that contains the appropriate gain, offset, and bias settings that can either be read directly into the focal plane array 20 via its read-out integrated circuit 24 or can be performed using simple analog or digital circuits.

The gain, offset and/or bias for each pixel of the focal plane array is determined at each small temperature increment over the entire operating temperature range. The size of this small temperature increment is based on temperature measurement accuracy and the minimum temperature increment that results in a significant change in the focal plane array's response. For example, the array 20 is placed into a controlled oven and exposed in sequence to two standard blackbody sources at each temperature, T. The output of each pixel location is measured and then used to solve for the gain and offset for each pixel location at each T. The temperature of the oven is increased by 0.2° C. and the entire process continued over the entire temperature spectrum of operation. Each focal plane array 20 is separately calibrated in an automated procedure. The temperature steps may be increased above 0.2° C. to 2° C. for example and the interlying points mathematically interpolated in temperature intervals which are sufficiently linear as determined by the degree of accuracy needed. This data is stored in high density flash memory such that:

The pixel order in which the data is stored is the same as the pixel order addressed by the integrated read-out circuit 24, on the focal plane array 20;

Data for each temperature increment is stored in a separate and discrete addressable page of the flash memory 46; and The address of these pages of data in flash memory 46 are stored in temperature increment order, that is in either an increasing or decreasing of temperature order across the operating range of the focal plane array 20.

The resulting flash memory database can then be accessed by:

Measuring the ambient temperature on the focal plane array 20;

Digitizing this temperature measurement using an analog to digital converter (ADC) 62;

Applying a fixed offset and gain value to this digitized temperature reading that results in calculating the flash memory address; and Using the address as a pointer to the portion of memory that should be read out, where the portion of memory that is read out is the data for the measured ambient temperature of the focal plane array 20.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for temperature compensating a focal plane array having a plurality of pixel locations comprising the steps of:

measuring the temperature of said focal plane array;

converting said measured temperature of said focal plane array to a digital address;

addressing a memory page in which operating parameters of each pixel location are stored using a logic circuit;

reading out said operating parameters for an addressed pixel location from said memory using a logic circuit;

converting said operating parameters of said addressed pixel location from said memory to analog form;

measuring radiant energy incident on said addressed pixel location;

analog processing said operating parameters of each pixel location from said memory with said measured radiant energy incident on said addressed pixel location to provide a temperature compensated measurement; and repeating the steps of measuring radiant energy and of analog processing said operating parameters to provide a temperature compensated measurement for each pixel location in said focal plane array.

2. The method of claim 1 where reading out said operating parameters for an addressed pixel location from said memory using a logic circuit comprises reading out gain, $g_j(T)$, and offset, $Z_{j,0}(T)$, for each pixel location, j, for said measured temperature, T, of said focal plane array.

3. The method of claim 2 where analog processing said operating parameters of each pixel location from said memory with said measured radiant energy incident on said addressed pixel location to provide a temperature compensated measurement comprises performing the operation given by $Z_j(T, I)=g_j(T)[Z_j(T, I)+Z_{j,0}(T)]$ In analog circuits, where $Z_j$ is the output of the jth pixel location, T is temperature of the focal plane array, I is the intensity of the incident radiant energy, $g_j$ is the gain of the jth pixel location at temperature T and $Z_{j,0}$ is an offset value associated with the jth pixel location at temperature T.

4. The method of claim 3 where said focal plane array is a bolometer and where said output $Z_j$ is an impedance of the jth pixel location and where analog processing said output of said pixel locations provides a temperature compensate value of impedance of each pixel location.

5. The method of claim 3 where said focal plane array is a photoelectric array and where said output $Z_j$ is a voltage or current of the jth pixel location and where analog processing said output of said pixel locations provides a temperature compensate value of voltage or current of each pixel location.

6. The method of claim 1 where said focal plane array includes an integrated readout circuit and further comprising reading said pixel locations in said focal plane array in a predetermined order using said integrated read-out circuit and where reading out said operating parameters for an addressed pixel location from said memory using a logic circuit comprises reading out said operating parameters in said predetermined order.

7. The method of claim 1 where addressing a memory page in which operating parameters of each pixel location are stored using a logic circuit comprises addressing said memory page corresponding to temperature increments across a temperature operating band of said focal plane array.

8. The method of claim 7 where addressing said memory page corresponding to temperature increments across a temperature operating band of said focal plane array comprises addressing said memory page in temperature increment order.

9. The method of claim 1 where said method is performed on an uncooled focal plane array.

10. The method of claim 1 further comprising composing a single still image from said temperature compensated measurement for each pixel location in said focal plane array.

11. The method of claim 1 further comprising composing a sequence of video images from said temperature compensated measurements for each pixel location in said focal plane array over a sequence of time.

12. An apparatus comprising:

a focal plane array having a plurality of pixel locations;

a thermometer coupled to said focal plane array for measuring the temperature of said focal plane array;

a logic converter coupled to said thermometer for converting said measured temperature of said focal plane array to a digital address;

a memory coupled to said logic converter having a plurality of pages in which operating parameters of each pixel location are stored, where said logic converter is coupled to said memory to read said operating parameters of each of said pixel locations from said memory and to convert said operating parameters into analog form;

a read-out circuit coupled to said focal plane array for measuring radiant energy incident on said pixel locations; and an analog or digital circuit coupled to said logic converter and to said read-out circuit for processing said operating parameters of each pixel location from said memory with said measured radiant energy incident on said addressed pixel location to provide a temperature compensated measurement for each of said pixel locations.

13. The apparatus of claim 12 where said logic converter reads out said operating parameters of said pixel locations from said memory by reading out gain, $g_j(T)$, and offset, $Z_{j,0}(T)$, for each pixel location, j, for said measured temperature, T, of said focal plane array.

14. The apparatus of claim 13 where analog circuit processes said operating parameters of each pixel location from said memory with said measured radiant energy incident on said addressed pixel location to provide a temperature compensated measurement comprises performing the operation given by $Z_j(T, I)=g_j(T)[Z_j(T, I)+Z_{j,0}(T)]$ in said analog or digital circuit, where $Z_j$ is the output of the jth pixel location, T is temperature of the focal plane array, I is the intensity of the incident radiant energy, $g_j$ is the gain of the jth pixel location at temperature T and $Z_{j,0}$ is an offset value associated with the jth pixel location at temperature T.

15. The apparatus of claim 14 where said focal plane array is a bolometer and where said output $Z_j$ is an impedance of the jth pixel location.

16. The apparatus of claim 14 where said focal plane array is a photoelectric array and where said output $Z_j$ is a voltage or current of the jth pixel location.

17. The apparatus of claim 12 where said read-out circuit reads said pixel locations in said focal plane array in a predetermined order and where said logic converter reads out said operating parameters of said pixel locations from said memory in said predetermined order.

18. The apparatus of claim 12 where said logic converter addresses said memory pages in which operating parameters of each pixel location are stored by addressing said memory pages corresponding to temperature increments across a temperature operating band of said focal plane array.

19. The apparatus of claim 18 where said logic converter addresses said memory pages corresponding to temperature increments across a temperature operating band of said focal plane array by addressing said memory page in temperature increment order.

20. The apparatus of claim 12 where said focal plane array is an uncooled focal plane array.

21. The apparatus of claim 12 further comprising a controller for composing a single still image from said temperature compensated measurement for each pixel location in said focal plane array.

22. The apparatus of claim 12 further comprising a controller for composing video images from said temperature compensated measurements for each pixel location in said focal plane array over a sequence of time.

23. An apparatus comprising:

a focal plane array means for providing a plurality of pixel locations;

a thermometer means coupled to said focal plane array for measuring the temperature of said focal plane array;

a logic converter means coupled to said thermometer means for converting said measured temperature of said focal plane array means to a digital address;

a memory means coupled to said logic converter means having a plurality of pages in which operating parameters of each pixel location are stored, where said logic converter means is coupled to said memory means to read said operating parameters of each of said pixel locations from said memory means and to convert said operating parameters into analog form;

a read-out circuit means coupled to said focal plane array for measuring radiant energy incident on said pixel locations; and an analog or digital circuit means coupled to said logic converter means and to said read-out circuit means for processing said operating parameters of each pixel location from said memory means with said measured radiant energy incident on said addressed pixel location to provide a temperature compensated measurement for each of said pixel locations.

* * * * *

UNITED STATES PATENT AND TRADEMARK OFFICE
CERTIFICATE OF CORRECTION

| | | |
|---|---|---|
| PATENT NO. | : 6,476,392 B1 | Page 1 of 1 |
| APPLICATION NO. | : 09/853819 | |
| DATED | : November 5, 2002 | |
| INVENTOR(S) | : Charles S. Kaufman et al. | |

It is certified that error appears in the above-identified patent and that said Letters Patent is hereby corrected as shown below:

The following is added at Column 1, Line 5:

"Statement Regarding Federally Sponsored Research and Development

This invention was made with U.S. Government support under Contract No. N39998-97-C-5201, awarded by the United States Navy. The U.S. Government has certain rights in the invention."

Signed and Sealed this

Thirty-first Day of March, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 6,476,392 B1 | Page 1 of 1 |
| APPLICATION NO. | : 09/853819 | |
| DATED | : November 5, 2002 | |
| INVENTOR(S) | : Charles S. Kaufman, Randolph S. Carlson and William B. Hornback | |

It is certified that error appears in the above-identified patent and that said Letters Patent is hereby corrected as shown below:

ON THE COVER PAGE OF THE PATENT:

Under Inventors, for the second inventor's last name listed:

Delete "Carson" and replace with --Carlson--.

(75) Inventors: Charles S. Kaufman, Long Beach CA (US);
Randolph S. ~~Carson~~ Carlson, Carson City, NV (US);
William B. Hornback, Trabuco Canyon, CA (US)

Signed and Sealed this

Twenty-ninth Day of June, 2010

David J. Kappos
*Director of the United States Patent and Trademark Office*